(12) United States Patent
Sanderovich et al.

(10) Patent No.: US 10,270,512 B2
(45) Date of Patent: Apr. 23, 2019

(54) TECHNIQUE FOR REDUCING SECTOR SWEEP TIME FOR MILLIMETER-WAVE DEVICES

(71) Applicant: QUALCOMM Incorporated, San Diego, CA (US)

(72) Inventors: Amichai Sanderovich, Atlit (IL); Alecsander Petru Eitan, Haifa (IL); Ran Hay, Rosh Haaein (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/342,735

(22) Filed: Nov. 3, 2016

(65) Prior Publication Data

US 2017/0126302 A1     May 4, 2017

Related U.S. Application Data

(60) Provisional application No. 62/278,505, filed on Jan. 14, 2016, provisional application No. 62/250,879, filed on Nov. 4, 2015.

(51) Int. Cl.
| | |
|---|---|
| *H04B 7/06* | (2006.01) |
| *H04W 16/14* | (2009.01) |
| *H04W 72/04* | (2009.01) |
| *H04L 12/743* | (2013.01) |
| *H04W 28/06* | (2009.01) |

(52) U.S. Cl.
CPC ....... *H04B 7/0682* (2013.01); *H04L 45/7453* (2013.01); *H04W 16/14* (2013.01); *H04W 28/06* (2013.01); *H04W 72/0446* (2013.01); *H04B 7/0617* (2013.01)

(58) Field of Classification Search
CPC .. H04B 7/0617; H04B 7/0408; H04B 7/0491; H04L 2025/03783
See application file for complete search history.

(56) References Cited

U.S. PATENT DOCUMENTS

| 8,315,154 B2 * | 11/2012 | Park | H04L 43/0811 |
| | | | 342/359 |
| 10,045,197 B1 | 8/2018 | Abdallah et al. | |

(Continued)

FOREIGN PATENT DOCUMENTS

WO    WO-2012103381 A1    8/2012

OTHER PUBLICATIONS

International Search Report and Written Opinion—PCT/US2016/060466—ISA/EPO—dated Feb. 10, 2017.

(Continued)

*Primary Examiner* — David S Huang
(74) *Attorney, Agent, or Firm* — Patterson & Sheridan, LLP

(57) ABSTRACT

Certain aspects of the present disclosure provide techniques that may help reduce sector sweep time. In some cases, the techniques involve generating frames for transmission during a sector sweep procedure, each frame including one or more address fields being determined based on at least one of a transmitter address of the apparatus or a receiver address of an intended recipient of the generated frames and having fewer bits than at least one of the transmitter address or the receiver address.

23 Claims, 12 Drawing Sheets

(56) References Cited

U.S. PATENT DOCUMENTS

| | | | |
|---|---|---|---|
| 2010/0164805 A1* | 7/2010 | Niu | H01Q 1/125 |
| | | | 342/377 |
| 2011/0069688 A1* | 3/2011 | Zhang | H04L 1/0083 |
| | | | 370/338 |
| 2013/0022032 A1 | 1/2013 | Taghavi Nasrabadi et al. | |
| 2014/0092779 A1 | 4/2014 | Seok et al. | |
| 2015/0078384 A1 | 3/2015 | Jackson et al. | |
| 2015/0288427 A1* | 10/2015 | Wang | H04W 72/1273 |
| | | | 370/329 |
| 2016/0255660 A1 | 9/2016 | Son et al. | |
| 2016/0277088 A1* | 9/2016 | Jo | H04B 7/0408 |
| 2017/0134076 A1* | 5/2017 | Maamari | H04B 7/0452 |
| 2017/0352954 A1 | 12/2017 | Abdallah et al. | |
| 2017/0353984 A1 | 12/2017 | Abdallah et al. | |
| 2018/0063723 A1 | 3/2018 | Sanderovich et al. | |

OTHER PUBLICATIONS

"ISO/IEC/IEEE International Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications", Amendment 3: Enhancement for Very High Throughput in the 60 GHz Band ( Adoption of IEEE Std 802.11ad-2012), IEEE Standard, IEEE, Piscataway, NJ, USA, Mar. 14, 2014, pp. 1-634, XP068070330.

Nitsche T., et al., "IEEE 802.11ad: Directional 60 GHz communication for multi-Gigabit-per-second Wi-Fi [Invited Paper]", IEEE Communications Magazine, IEEE Service Center, Piscataway, us. vol. 52. No. 12, Dec. 1, 2014 (Dec. 1, 2014), XP011567636, pp. 132-141.

\* cited by examiner

| Frame Control | Duration | RA | TA | SSW | SSW Feedback | FCS |
|---|---|---|---|---|---|---|
| Octets: 2 | 2 | 6 | 6 | 3 | 3 | 4 |

900

|  | Original | Option1 | Option2 |
|---|---|---|---|
| Payload [Bytes] | 26 | 6 | 10 |
| Time [us] | 15.76 | 9.80 | 13.44 |
| Saving [%] | 0 | 37.83 | 14.76 |

FIG. 9

TECHNIQUE FOR REDUCING SECTOR SWEEP TIME FOR MILLIMETER-WAVE DEVICES

CLAIM OF PRIORITY UNDER 35 U.S.C. § 119

The present Application for Patent claims benefit of U.S. Provisional Patent Application Ser. No. 62/250,879, filed Nov. 4, 2015 and U.S. Provisional Patent Application Ser. No. 62/278,505, filed Jan. 14, 2016, each assigned to the assignee hereof and hereby expressly incorporated by reference herein.

TECHNICAL FIELD

The invention relates generally to wireless communications systems and, more particularly, a technique for reducing sector sweep time during beam training in systems that utilize beamforming.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc, resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

Certain aspects of the present disclosure provide an apparatus for wireless communications. The apparatus generally includes a processing system configured to generate frames for transmission during a sector sweep procedure, each frame including one or more address fields being determined based on at least one of a transmitter address of the apparatus or a receiver address of an intended recipient of the generated frames and having fewer bits than at least one of the transmitter address or the receiver address, and an interface configured to output the frames for transmission during the sector sweep procedure.

Certain aspects of the present disclosure provide an apparatus for wireless communications. The apparatus generally includes an interface configured to obtain frames during a sector sweep procedure, each frame including one or more address fields having fewer bits than at least one of a transmitter address of a transmitter of the frame or a receiver address of an intended recipient of the frame, and a processing system configured to determine at least one of the transmitter address or the receiver address based on the one or more address fields and to process a remaining portion of the frame based on the determination.

Certain aspects of the present disclosure also provide various other apparatus, methods, and computer readable medium for performing the operations described herein.

BRIEF DESCRIPTION OF THE DRAWINGS

FIG. 9 illustrates examples in a tabular representation, in accordance with certain aspects of the present disclosure, in accordance with certain aspects of the present disclosure.

DETAILED DESCRIPTION

Figure 1:
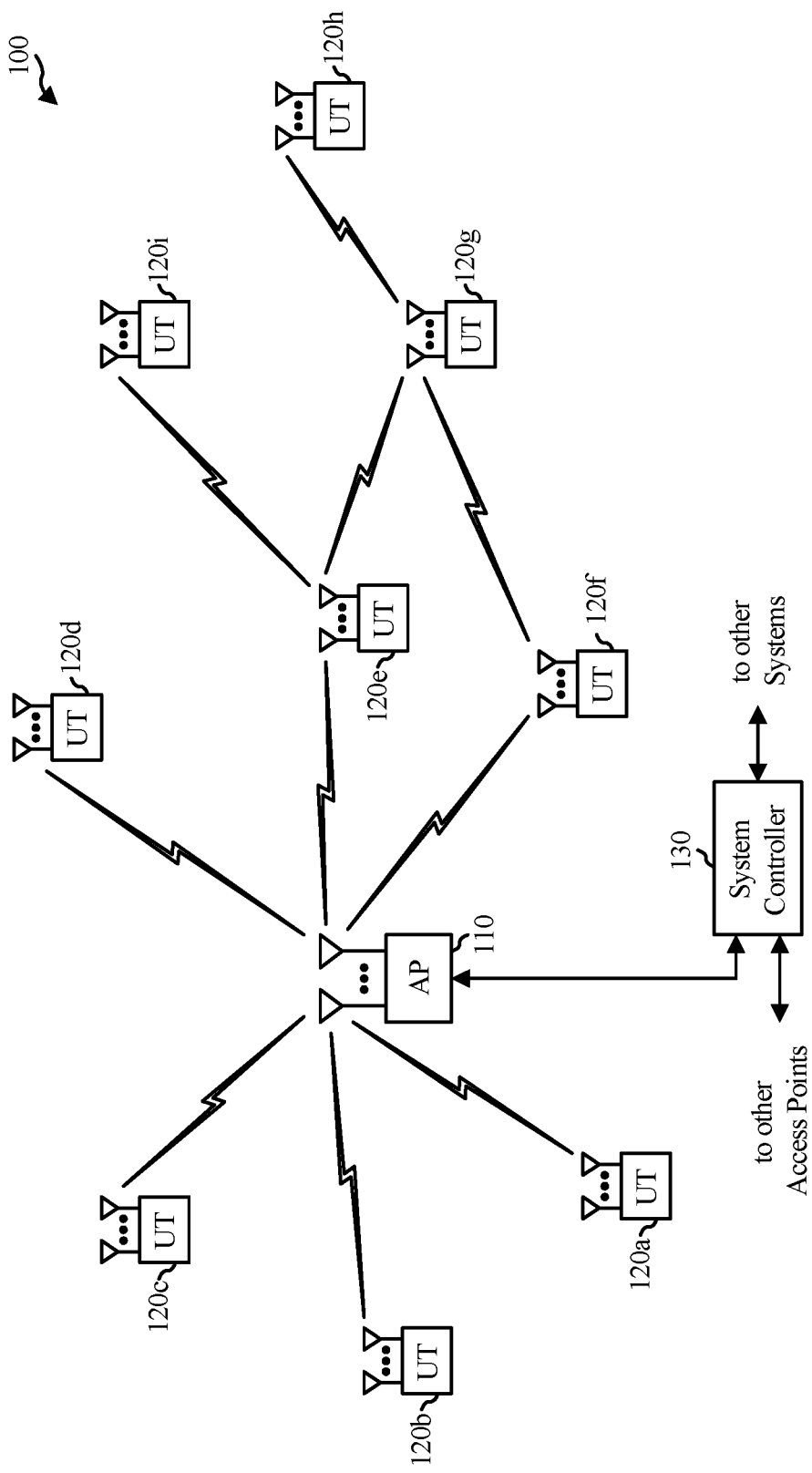
FIG. 1 illustrates a diagram of an example wireless communications network, in accordance with certain aspects of the present disclosure.

Aspects of the present disclosure may help reduce time during sector sweep procedures. By reducing the length of sector sweep frames, for example, by compressing or removing one or more fields, transmission time of each sector sweep frame may be reduced. As multiple sector sweep frames are typically transmitted in a sector sweep procedure, the reductions are compounded. Given that a station may perform a sector sweep procedure with several hundred stations, reducing transmission time of each frame by even micro-seconds, may result in an overall reduction of several milliseconds.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced.

For example, access point 110 or user terminals 120 may generate frames for transmission during a sector sweep procedure utilizing techniques described herein. In some cases, user terminals may be game controllers or the like, and the techniques may be applied to generate frames for transmission during a sector sweep procedure of the game controllers to a game station (acting as an access point).

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$) The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
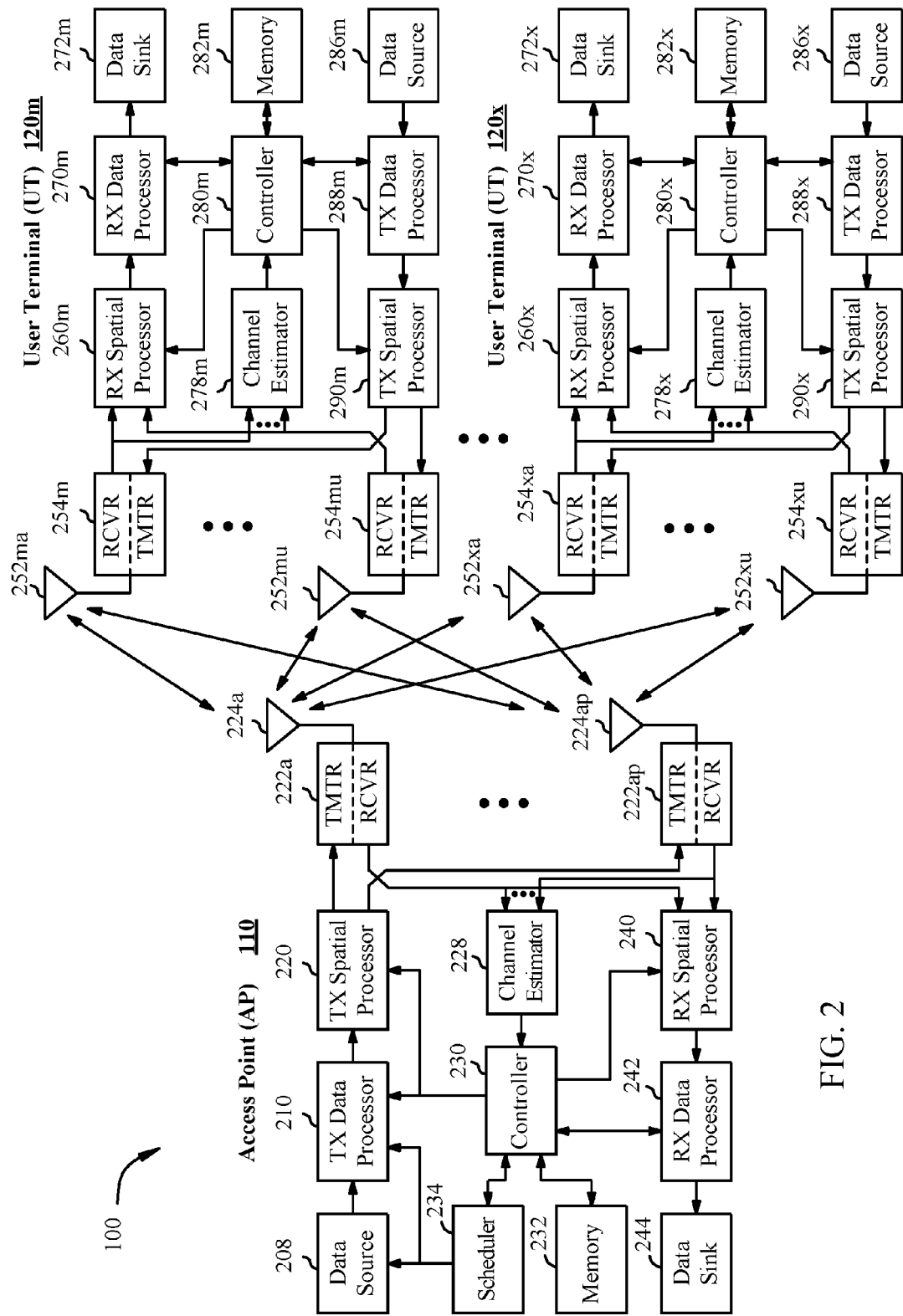
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100 in which aspects of the present disclosure may be practiced. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix Hdn,m for that user terminal. Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, the various processors shown in FIG. 2 may direct the operation at an AP 110 and/or user terminal 120, respectively, to perform various techniques described herein.

Figure 3:
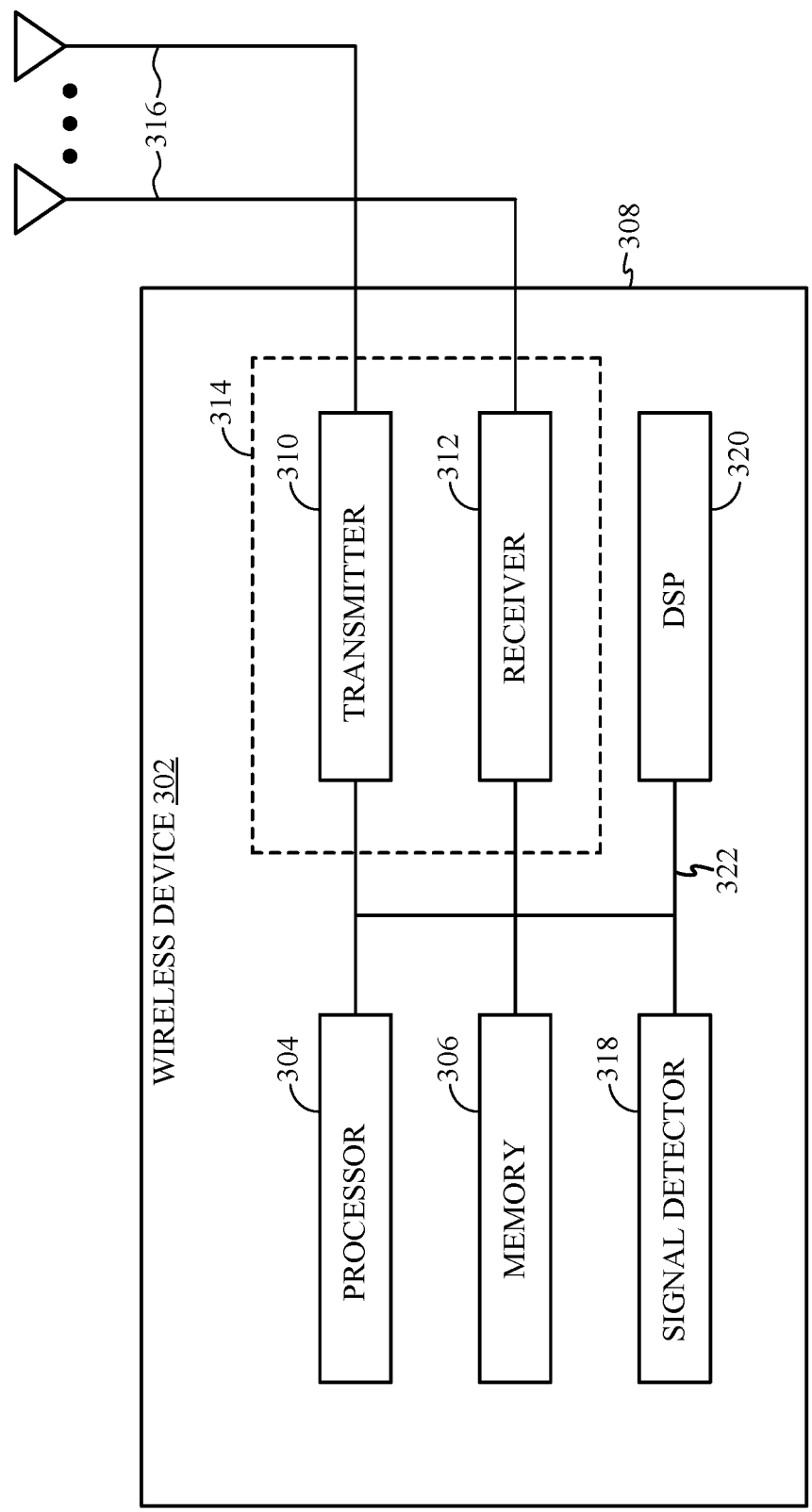
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to generate frames for transmission during a sector sweep procedure and/or other processes for the techniques described herein and/or may perform or direct operations 700 in FIG. 7 to process such frames during a sector sweep procedure.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

A beamforming process may solve one of the problems for communication at the millimeter-wave spectrum, which is its high path loss. As such, as shown in FIG. 2, a large number of antennas are place at each transceiver to exploit the beamforming gain for extending communication range. That is, the same signal is sent from each antenna in an array, but at slightly different times.

According to an exemplary embodiment, the BF process includes a sector level sweep (SLS) phase and a beam refinement stage. In the SLS phase, one of the STAs acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. As mentioned above, a station may be a transceiver that includes one or more active antennas in an antenna array (e.g., a phased antenna array).

The SLS phase typically concludes after an initiating station receives sector sweep feedback and sends a sector acknowledgement (ACK), thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the beam refinement phase, each station can sweep a sequence of transmissions, separated by a short beamforming interframe space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 4:
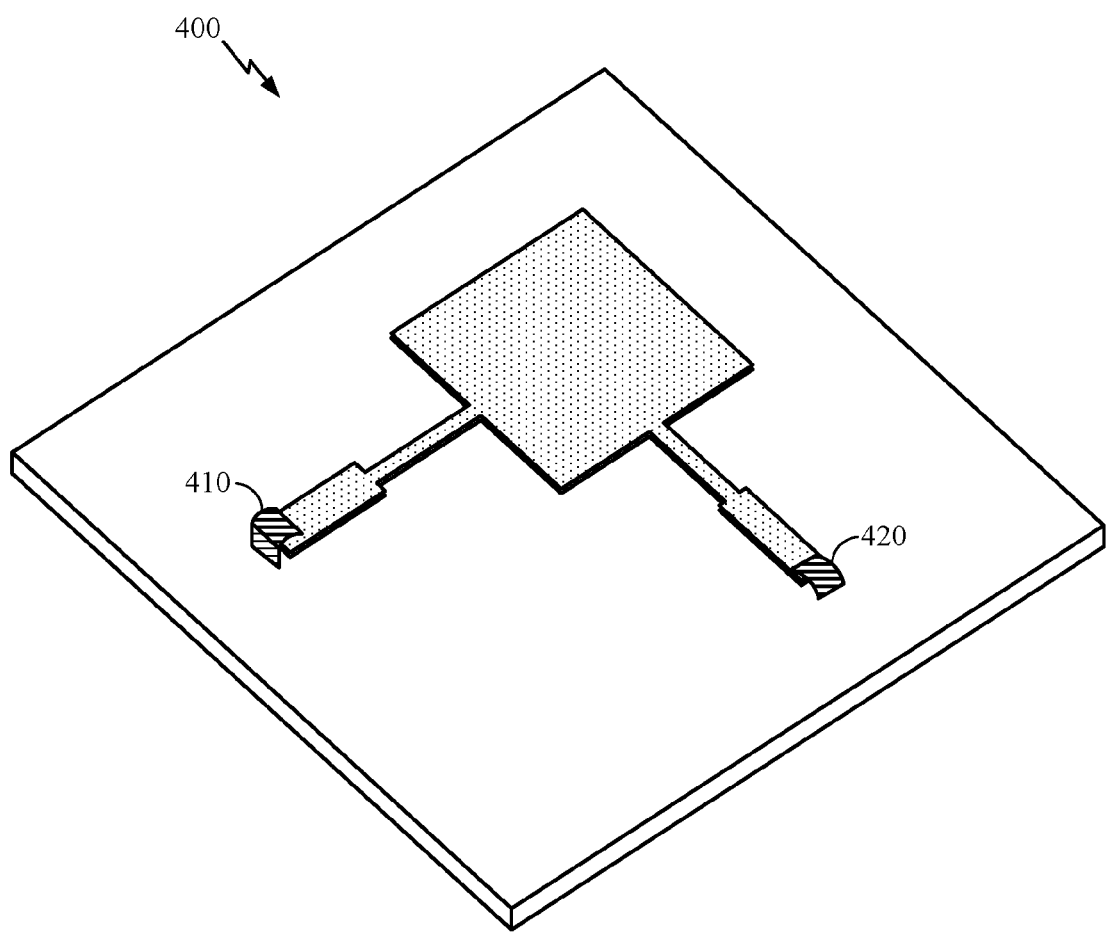
FIG. 4 illustrates an example dual polarized patch element, in accordance with certain aspects of the present disclosure.

FIG. 4 illustrates an example dual polarized patch element 400 which may be employed, in accordance with certain aspects of the present disclosure. As shown in FIG. 4, a single element of an antenna array may contain multiple polarized antennas. Multiple elements may be combined together to form an antenna array. The polarized antennas may be radially spaced. For example, as shown in FIG. 4, two polarized antennas may be arranged perpendicularly, corresponding to horizontally and vertically polarized antennas. Alternatively, any number of polarized antennas may be used. Alternatively or in addition, one or both antennas of an element may also be circularly polarized.

Figures 5, 5A:
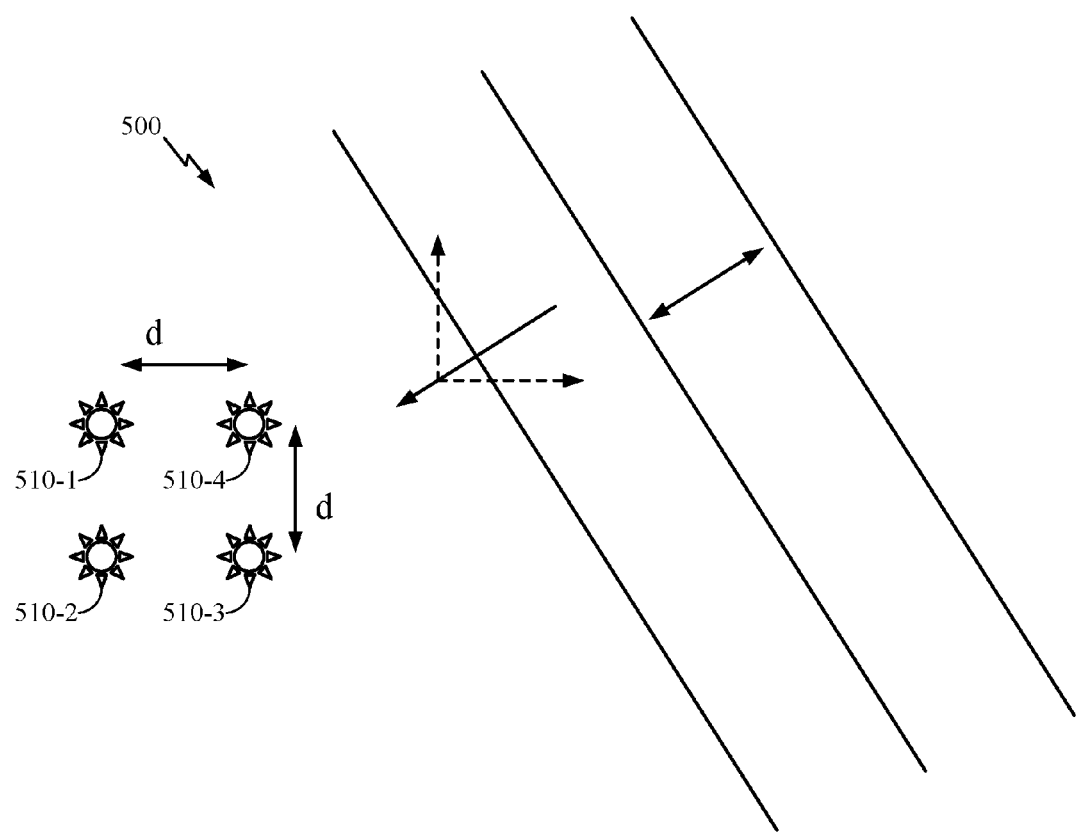
FIG. 5 is a diagram illustrating signal propagation in an implementation of phased-array antennas.
FIG. 5A illustrates a conventional sector sweep frame format.

FIG. 5 is a diagram illustrating signal propagation 500 in an implementation of phased-array antennas. Phased array antennas use identical elements 510-1 through 510-4 (hereinafter referred to individually as an element 510 or collectively as elements 510). The direction in which the signal is propagated yields approximately identical gain for each element 510, while the phases of the elements 510 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This requires that a phased array be able to handle rotation of the electrical field by using antennas or antenna feeds that match a certain polarity and capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

As noted above, a sector sweep procedure may be performed as part of an overall beamforming (BF) training process according to, for example, the IEEE 802.11ad standard, that also involves a subsequent beamforming refinement protocol (BRP). The BF training process is typically employed by a pair of millimeter-wave stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link may be established with optimal receive and/or transmit antenna settings.

Example Reduction of Sector Sweep Time

As noted above, aspects of the present disclosure may help reduce time during sector sweep procedures. By utilizing a compressed frame format for sector sweep frames (e.g., by compressing or removing one or more bits from one or more fields or removing one or more frames entirely) the transmission time of each sector sweep frame may be reduced. The techniques may be applied to any types of devices taking part in beamforming training involving a sector sweep, such as game controller, mobile phones, or the like.

FIG. 5A illustrates a conventional sector sweep (SSW) frame format that may be used in a sector sweep procedure. As will be described in greater detail below with reference to FIGS. 8A and 8B, a compressed frame format may be generated by compressing one or more of the fields illustrated in FIG. 5A (e.g., such that fewer bits are used to convey the same information) or by removing one or more of the fields entirely.

According to certain aspects of the present disclosure, one or both of a transmit address (TA) and receiver address (RA) may be compressed to a fewer number of bits than their combined original total. As used herein, the term address generally refers to any type of address, including what may be considered a conventional address (e.g., that uniquely defines a device) or an association ID (AID) that is assigned to a station by an AP.

Figure 6:
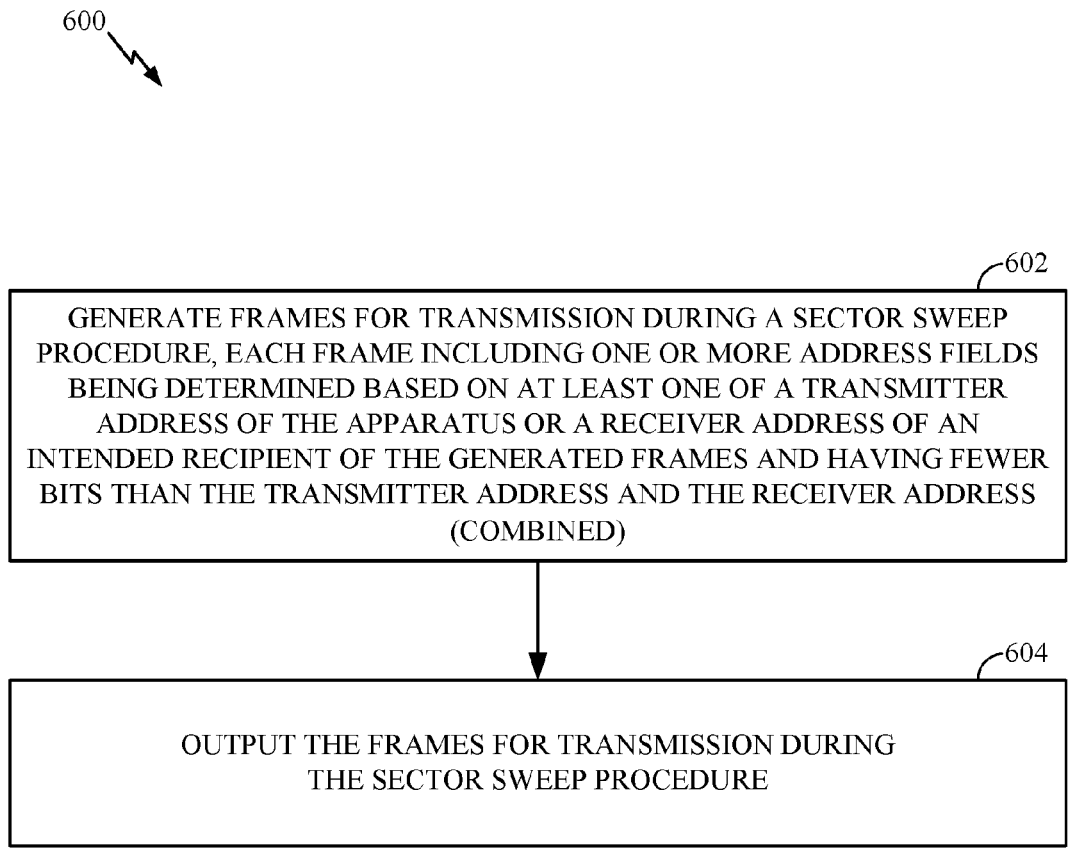
FIG. 6 illustrates example operations that may be performed by an apparatus for generating frames during a sector sweep procedure, in accordance with certain aspects of the present disclosure.

FIG. 6 illustrates example operations 600 that may be performed by an apparatus for generating sector sweep frames using a compressed frame format during a sector sweep procedure, in accordance with certain aspects of the present disclosure.

The operations 600 performed by the apparatus begin at 602, by generating frames for transmission during a sector sweep procedure, each frame including one or more address fields being determined based on at least one of a transmitter address of the apparatus or a receiver address (combined) of an intended recipient of the generated frames and having fewer bits than the transmitter and the receiver addresses. For example, the address fields may be generated using a hash function applied to both the transmitter and receiver addresses (with the transmitter and receiver addresses as input) and the resulting value output may have fewer bits than the transmitter and receiver addresses combined or, in some cases, fewer bits than either the transmitter address or the receiver addresses. At 604, an interface outputs the frames for transmission during the sector sweep procedure.

Figure 7:
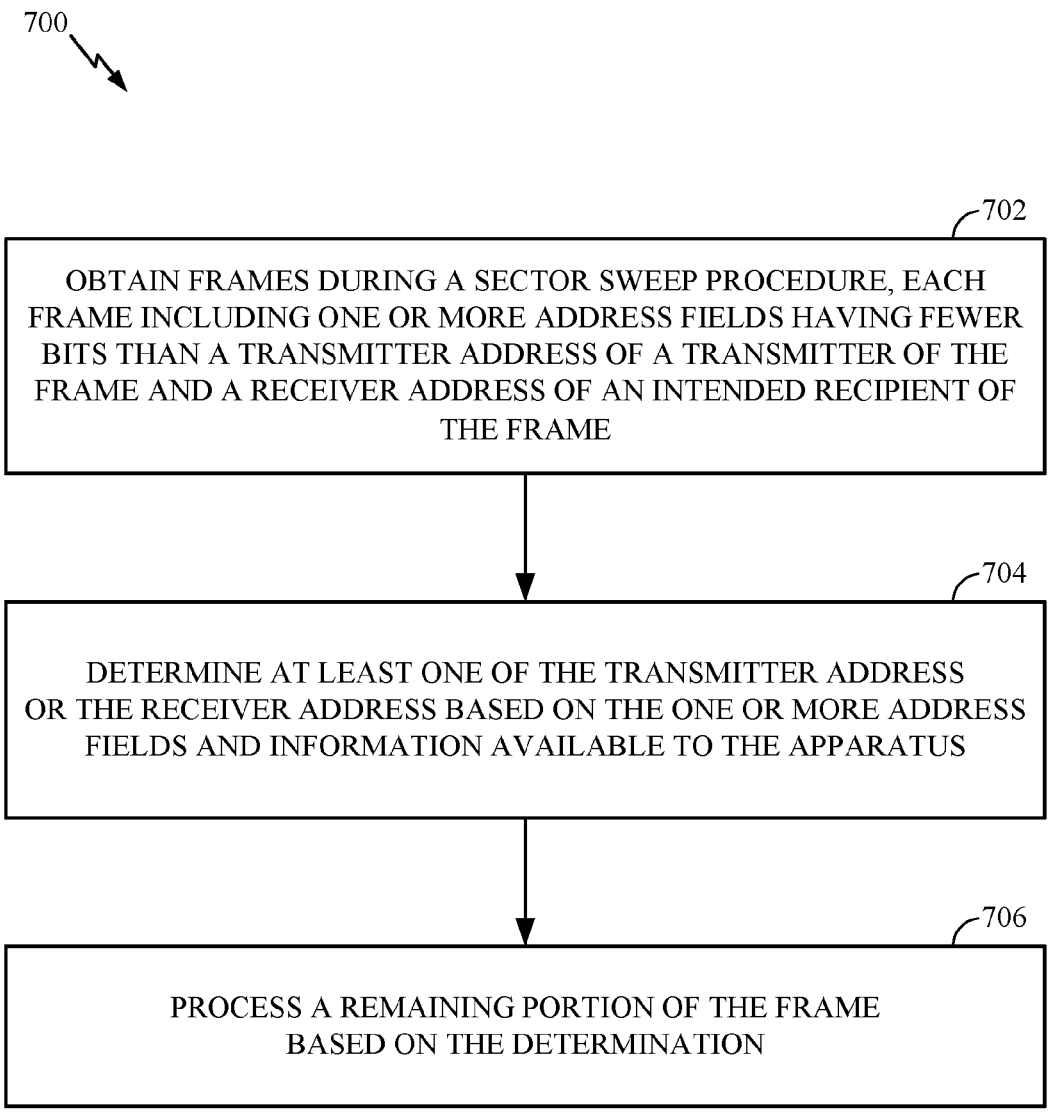
FIG. 7 illustrates example operation that may be performed by an apparatus for receiving frames during a sector sweep procedure, in accordance with certain aspects of the present disclosure.

FIG. 7 illustrates example operations 700 that may be performed by an apparatus for processing compressed sectors sweep frames during a sector sweep procedure, in accordance with certain aspects of the present disclosure. In other words, operations 700 may correspond to complementary operations performed by a station that is participating in beamforming training with another station generating compressed sector sweep frames according to operations 600 described above.

The operations 700 begin, at 702, by obtaining frames during a sector sweep procedure, each frame including one or more address fields having fewer bits than a transmitter address of a transmitter of the frame and a receiver address (combined) of an intended recipient of the frame.

At 704, the apparatus determines at least one of the transmitter address or the receiver address based on the address field and additional information. At 706, the apparatus processes a remaining portion of the frame based on the determination.

The additional information (which may be considered "side" information as it is not included in the frame), for example, may be one or more actual address stored in the receiver. In such cases, the compression applied when generating the frame may set the value of the address field to select between the stored addresses. A receiving device may check that the receiver address indicated by the value of the address field matches its own (to verify it is the intended recipient).

In some cases, the additional information may indicate a hash value used to generate the value of the address field based on the transmitter and receiver addresses. In this manner, the receiving device may be able to determine what transmitter and/or receiver addresses (when the hash function was applied) would have resulted in the value received in the address field. In some cases, additional information may be provided to the receiving device (by a transmitting device), for example, during an association procedure.

In some cases a compressed frame format may include an address field determined based on at least one of a transmitter address of the apparatus or a receiver address of an intended recipient of the generated (e.g., by applying a hash function). The amount of compression achieved in this manner may vary. For example, as shown in FIGS. 8A and 8B, a transmitter address (TA) field and receiver address (RA) field, 6 bytes each, may be combined to form a single field with a length of one byte or less.

Figure 8A:
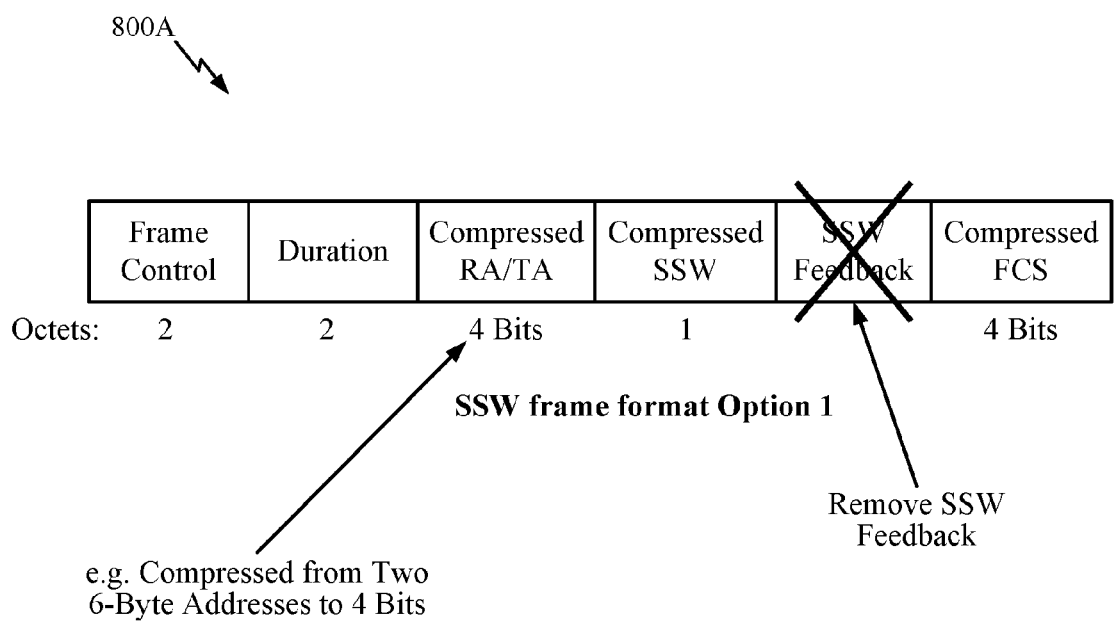
FIG. 8A illustrates an example of a sector sweep frame format, in accordance with certain aspects of the present disclosure.
Figure 8B:
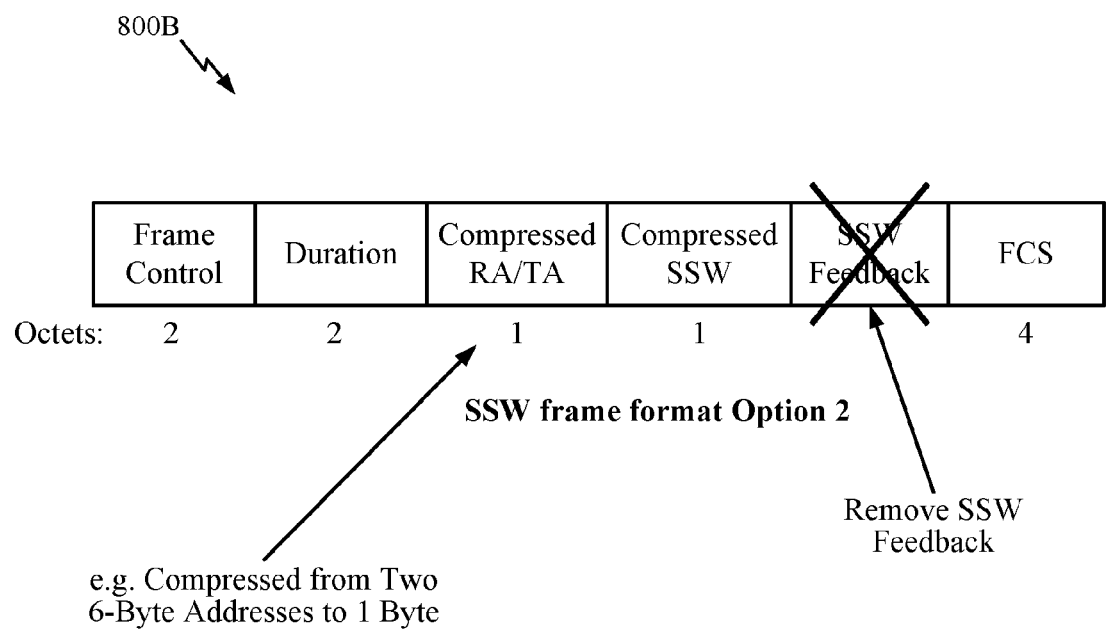
FIG. 8B illustrates another example sector sweep frame format, in accordance with certain aspects of the present disclosure.

FIG. 8A illustrates an example compressed sector sweep frame format 800A (referred to herein as Option 1), in accordance with certain aspects of the present disclosure. This example of a compressed sector sweep frame format may yield a reduction of 20 Bytes in frame length (and corresponding reduction in sector sweep time). Part of the time reduction may be obtained by using a hash function. The hash function, for example, may compress a 6-byte receiver address (RA) and a 6-byte transmission address (TA), or a total of 96-bit of addresses, to a half byte, or 4 bits.

The sector sweep frame format example of FIG. 8A further illustrates that a 4-byte frame check sequence (FCS) field may be shortened to 4 bits. Generally, FCS may be required for protecting data payload during the propagation of the payload to higher layers. However, because errors in the sector sweep frame do not propagate to higher layers, lower protection can be adequately provided.

In some cases, a 3-byte sector sweep feedback may be removed in some cases because the sector sweep feedback is only needed in a responder sweep. In some cases, a sector sweep frame can include a sector sweep field that indicates both a sector ID value and a sector sweep countdown value, and the sector sweep ID may equal to the sector sweep countdown number. In such cases, when no additional signaling for more antennas/RXSS length/Direction is needed. As the sector sweep ID and countdown value are typically carried in a sector sweep (SSW) field, the SSW frame length may be further reduced, for example, by compressing the SSW field from 3 bytes to 1 byte or 9 bits (e.g., by using a single sector sweep field for both sector sweep ID and sector sweep countdown).

In some cases, a sector sweep frame may include a value indicating the address field is compressed. For example, a frame format type may have a value indicating an address field has fewer bits than a transmitter address and a receiver address Based on a value of the frame format type, a station may identify a compressed address field and process the compressed address field accordingly.

In some cases, sector sweep frames may be discarded after processing (decompressing) the compressed address field. For example, a station may discard a frame if a receiver or transmitter address determined from an address field of the frame does not match any addresses of the receiver or transmitter (or if a generated FCS does not match the FCS included in a frame).

FIG. 8B illustrates another example of compressed sector sweep frame format 800B (referred to herein as Option 2), in accordance with certain aspects of the present disclosure. The sector sweep frame format example may result in a 16-byte reduction in length (and corresponding reduction from sector sweep time).

In this example, the two 6-byte RA/TA addresses may be compressed to a single byte (compared to the half byte shown in FIG. 8A). In this example, the FCS may be the same as conventional frame shown in FIG. 5A, but the sector sweep feedback can be removed and the SSW field may still be compressed (in other words, a sector sweep frame may lack a sector sweep feedback field).

In another example of compressed sector sweep frame format (referred to herein as Option 3), in accordance with certain aspects of the present disclosure, the combined length of RA and TA may be compressed even further. In this example, the RA/TA addresses may be compressed from two 6-byte fields (96 bits total) to a single 2.5-byte field (20 bits). This compression may be achieved, for example, using a 100 bit to 20 bit hash function. For associated STAs, the uncompressed RA and TA addresses will be known, so the recipient can apply the hash function to the known addresses to see if the results match the value of the compressed RA/TA address field.

In some cases, the compressed RA and TA field may also be based on a scrambler seed or a PHY header CRC of the SSW frame. The scrambler seed may be different per SSW procedure or per SSW frame. As such, an indication of the scrambler seed may be provided to the station. For example, the scrambler seed (or a hashed value generated using the scrambler seed which may also allow the station to determine the scrambler seed used) may be provided in one or more of the SSW frames (e.g., as part of the compressed address field or as a separate field). Dependency on the scrambler seed in this manner may help ensure that a STA that incorrectly detected its own RA after uncompressing the compressed TA/RA field will not repeat this false detection. Of course, reducing the amount of compression (e.g., using more bits for the output of the hash function) may further reduce the chances for a false RA match.

As illustrated in FIG. 8A, the FCS field may also be compressed, for example, from 4 bytes to half a byte (4 bits), which may have a relatively low impact on false positives. The duration field and sector sweep feedback field may also be removed (so the SSW frame lacks these fields). In some cases, the duration field may be compressed by either quantization to lower resolution (e.g., greater than 1 us so fewer bits are needed to indicate a given duration) or use a same resolution with a shorter length (meaning a shorter maximum duration can be indicated), for example, taking the countdown ID into consideration.

As illustrated, the SSW field may also be compressed (e.g., from 3 bytes to 1.5 bytes). This SSW compression may be achieved, for example, by using a 12 bit countdown field, with 10 bits for sectors and 2 bits for antennas (or some other similar type bit allocation).

FIG. 9 illustrates a table 900 listing example reductions of sector sweep time that may be accomplished using the frame formats shown in FIGS. 8A and 8B, relative to the conventional frame format shown in FIG. 5A.

As illustrated, by utilizing Option 1 illustrated in FIG. 8A, reductions of up to 37% may be achieved, while utilizing Option 2 illustrated in FIG. 8B, may yield reductions of up to 15%. The exact yield achieved may represent a tradeoff between reductions in transmission time and an increase probability of undetected errors. Further, the reduction in sector sweep time may be orthogonal (e.g., independent of) to other methods that reduce the sector sweep time.

Because there can be hundreds of sectors that need to be sweep during a sector sweep procedure, the accumulative time reduction in sector sweep time using the compressed frame formats described herein during a sector sweep procedure can be significant. For example, a device with a relatively large antenna array may need additional sectors to be used for training, and an access point (AP) with 256 antennas that use 256 sectors may spend 4 ms for sector sweep. Thus, the aggregate sector sweep time for training of 10 STAs can be greater than 40 ms. Therefore, utilizing the compressed frame formats described herein to reduce transmission time of each frame may result in significant performance improvements.

Figure 6A:
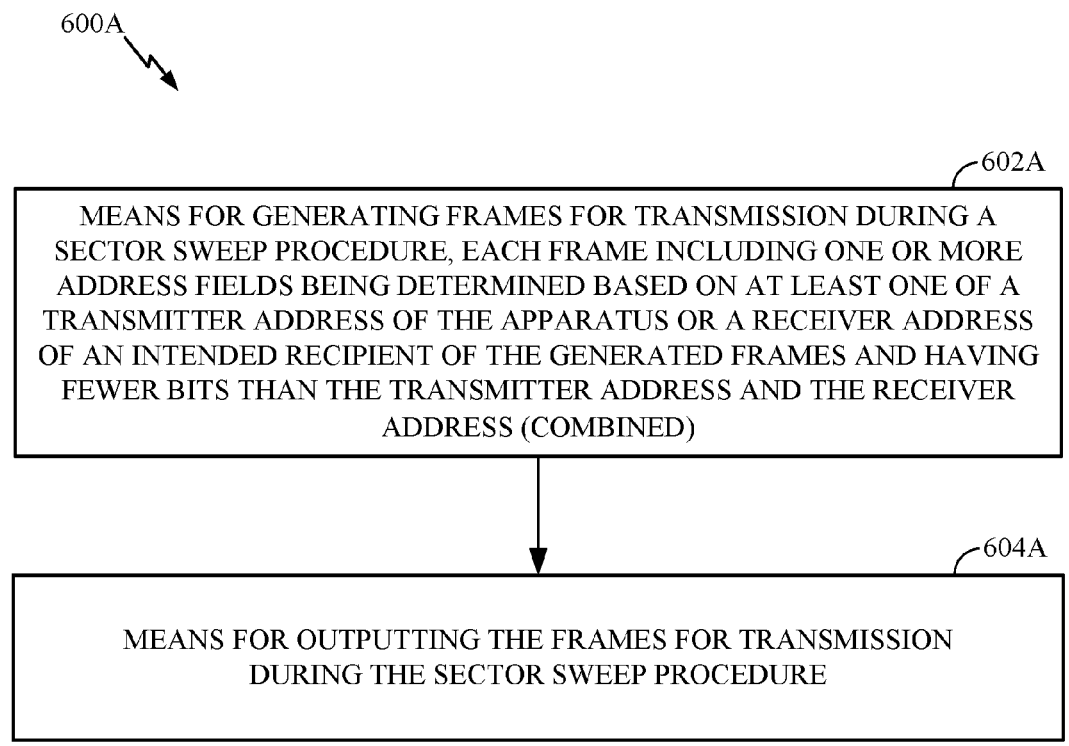
FIG. 6A illustrates components capable of performing the operations shown in FIG. 6, in accordance with certain aspects of the present disclosure.
Figure 7A:
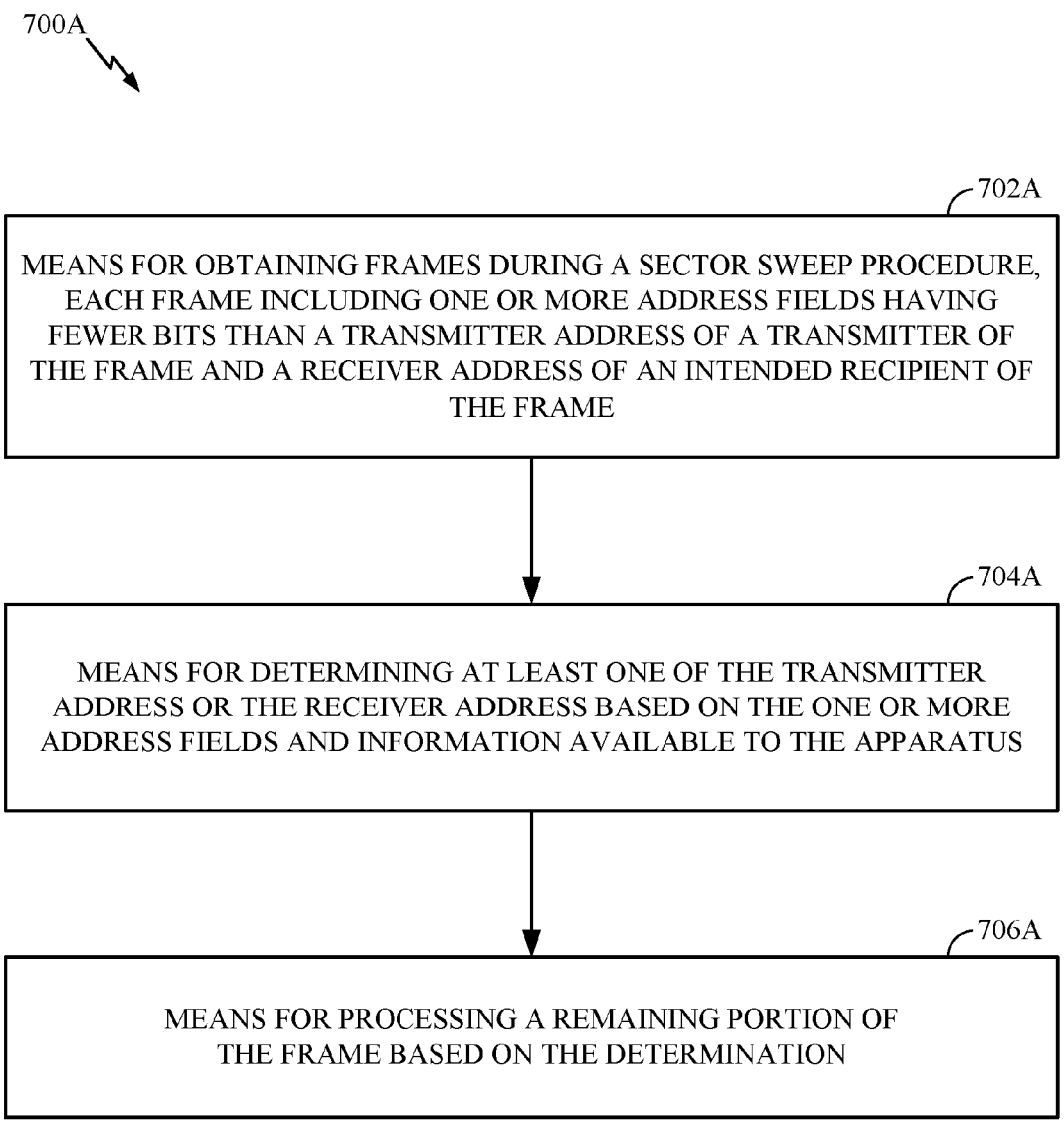
FIG. 7A illustrates components capable of performing the operations shown in FIG. 7, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 and 700 illustrated in FIGS. 6 and 7 correspond to means 600A and 700A illustrated in FIGS. 6A and 7A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for obtaining, means for generating, means for selecting, means for decoding, means for causing, means for servicing, means for assigning, means for re-assigning, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for generating frames for transmission during a sector sweep procedure.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node.

The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address or the receiver address, and wherein each frame lacks a sector sweep feedback field; and
an interface configured to output the frames for transmission during the sector sweep procedure.

2. The apparatus of claim 1, wherein each frame also includes a sector sweep field that indicates both a sector ID value and a sector sweep countdown value.

3. The apparatus of claim 2, wherein the sector ID value and sector sweep countdown value are the same.

4. The apparatus of claim 1, wherein each frame also includes a sector sweep field that has a first number of one or more bits to indicate a countdown value for a sector ID and a second number of one or more bits to indicate a countdown for an antenna configuration.

5. The apparatus of claim 1, further comprising:
a transmitter configured to transmit the frames during the sector sweep procedure, wherein the apparatus is configured as a wireless node.

6. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address or the receiver address, and wherein each frame also includes a frame check sequence (FCS) comprising a length of less than 4 bytes; and
an interface configured to output the frames for transmission during the sector sweep procedure.

7. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address and the receiver address combined, wherein the processing system is configured to determine the one or more address fields based on a hash function applied to at least one of the transmitter address or the receiver address; and
an interface configured to output the frames for transmission during the sector sweep procedure.

8. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address or the receiver address, wherein the processing system is configured to generate the one or more address fields based, at least in part, on one or more scrambler seeds to be used to scramble the frames prior to transmission; and
an interface configured to output the frames for transmission during the sector sweep procedure.

9. The apparatus of claim 8, wherein the one or more address fields, in at least one of the frames, comprise:
a first address value that is independent of a scrambler seed; and
a second address value generated based on the first address value and a scrambler seed.

10. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address and the receiver address combined, wherein the processing system is configured to generate the one or more address fields in each frame based, at least in part, on check values of a header portion of the frame; and
an interface configured to output the frames for transmission during the sector sweep procedure.

11. An apparatus for wireless communications, comprising:
a processing system configured to generate frames for transmission during a sector sweep procedure, each frame including one or more address fields being determined based on at least one of a transmitter address of the apparatus or a receiver address of an intended recipient of the generated frames and having fewer bits than the transmitter address or the receiver address, wherein each of the frames comprises a field having a frame format type with a value indicating the one or more address fields have fewer bits than the transmitter address or the receiver address; and
an interface configured to output the frames for transmission during the sector sweep procedure.

12. An apparatus for wireless communications, comprising:
an interface configured to obtain frames during a sector sweep procedure, each frame including one or more address fields having fewer bits than a transmitter address of a transmitter of the frame or a receiver address of an intended recipient of the frame; and
a processing system configured to determine at least one of the transmitter address or the receiver address, based on the one or more address fields and additional information, and to process a remaining portion of the frame based on the determination.

13. The apparatus of claim 12, wherein:
the additional information comprises one or more addresses stored at the apparatus; and
a value of the one or more address fields indicates one of the stored addresses.

14. The apparatus of claim 12, wherein the processing system is configured to discard one of the frames if at least one of:
a receiver address determined based on the one or more address fields of that frame does not match an address of the apparatus; or
a transmitter address determined based on the one or more address fields of that frame does not match an address of a desired transmitter.

15. The apparatus of claim 12, wherein:
each frame also includes a sector sweep field; and
the processing system is configured to determine both a sector ID value and a sector sweep countdown value based on the sector sweep field and update a status of the sector sweep procedure based on the sector ID value and the sector sweep countdown value.

16. The apparatus of claim 15, wherein the sector ID value and sector sweep countdown value are the same.

17. The apparatus of claim 12, wherein:
each frame also includes a frame check sequence (FCS) comprising a length of less than 4 bytes; and
the processing system is configured to generate, for each frame, an FCS based on the frame and to discard the frame if the generated FCS does not match the FCS included in the frame.

18. The apparatus of claim 12, wherein:
the processing system is configured to apply a hash function to at least one of the transmitter address or the receiver address and to compare results obtained from the application to the one or more addresses; and
the determination is based on the comparison.

19. The apparatus of claim 12, wherein:
each of the frames comprises a field having a frame format type; and
the processing system is configured to identify, based on a value of the frame format type, that the one or more address fields has fewer bits than at least one of the transmitter address or the receiver address and to process the one or more address fields based on the identification.

20. The apparatus of claim 19, wherein the processing system is further configured to process at least one of a sector sweep field of one or more of the obtained frames or a frame check sequence (FCS) field of one or more of the obtained frames based on the identification.

21. The apparatus of claim 12, wherein the determination is further based on one or more scrambler seeds.

22. The apparatus of claim 21, wherein:
the one or more address fields, in at least one of the frames, comprise a first address value that is independent of a scrambler seed and a second address value generated based on the first address value and a scrambler seed; and
the processing system is configured to determine the scrambler seed based on the second value, wherein the one or more scrambler seeds comprise the determined scrambler seed.

23. The apparatus of claim 12, further comprising:
a receiver configured to receive the frames during the sector sweep procedure, wherein the apparatus is configured as a wireless node.

\* \* \* \* \*